(12) United States Patent
Gross et al.

(10) Patent No.: US 11,633,704 B2
(45) Date of Patent: Apr. 25, 2023

(54) ROTATION MIXER WITH CONTINUOUS BELT DRIVE

(71) Applicant: FLACKTEK, INC., Landrum, SC (US)

(72) Inventors: Matthew L. Gross, Boulder, CO (US); Dale R. Flackett, Landrum, SC (US); Maxiliaan Gulden, Boulder, CO (US)

(73) Assignee: FLACKTEK SPEEDMIXER, INC., Landrum, SC (US)

( * ) Notice: Subject to any disclaimer, the term of this patent is extended or adjusted under 35 U.S.C. 154(b) by 311 days.

(21) Appl. No.: 17/027,454

(22) Filed: Sep. 21, 2020

(65) Prior Publication Data
US 2021/0086148 A1 Mar. 25, 2021

Related U.S. Application Data

(60) Provisional application No. 62/902,860, filed on Sep. 19, 2019.

(51) Int. Cl.
*B01F 29/00* (2022.01)
*F16H 7/02* (2006.01)
(Continued)

(52) U.S. Cl.
CPC .............. *B01F 29/40* (2022.01); *B01F 29/10* (2022.01); *B01F 29/20* (2022.01); *F16H 7/023* (2013.01);
(Continued)

(58) Field of Classification Search
CPC .......... B01F 29/40; B01F 29/10; B01F 29/20; B01F 29/40351; B01F 35/421; F16H 7/023; F16H 7/1263; F16H 2007/088
(Continued)

(56) References Cited

U.S. PATENT DOCUMENTS 3,679,184 A * 7/1972 Woodham .............. B01F 35/713
                                                        206/219
4,586,292 A * 5/1986 Carroll .................... B24B 11/00
                                                        451/329
(Continued)

FOREIGN PATENT DOCUMENTS

JP          63310629 A2    12/1988
JP          4084493    *    4/2008

OTHER PUBLICATIONS

International Search Report and Written Opinion for International Application No. PCT/US2020/051830; dated Dec. 15, 2020.

*Primary Examiner* — Charles Cooley
(74) *Attorney, Agent, or Firm* — Berg Hill Greenleaf Ruscitti LLP

(57) ABSTRACT

A rotation mixer including a housing, a drive unit coupled to the housing, a carriage mounted on the drive unit for rotation relative to the housing, and a basket mounted for rotation relative to the carriage. The basket receives material to be mixed. The carriage includes an arm and a drive line coupled to the arm. The arm is mounted on the drive unit for rotation about a first axis relative to the housing, and the drive line converts rotation of the arm into rotation of the basket about a second axis relative to the arm during use of the rotation mixer. The drive line illustratively includes a belt and plurality of pulleys upon which the belt travels in a continuous loop, the belt engaging with a gear on the basket to cause rotation of the basket.

18 Claims, 10 Drawing Sheets

(51) Int. Cl.
  *F16H 7/12* (2006.01)
  *B01F 29/10* (2022.01)
  *B01F 29/20* (2022.01)
  *F16H 7/08* (2006.01)

(52) U.S. Cl.
  CPC ...... *F16H 7/1263* (2013.01); *B01F 29/40351* (2022.01); *F16H 2007/088* (2013.01)

(58) Field of Classification Search
  USPC .......................................................... 366/217
  See application file for complete search history.

(56) References Cited

U.S. PATENT DOCUMENTS

| | | | |
|---|---|---|---|
| 5,551,779 | A | 9/1996 | Gantner et al. |
| 6,099,160 | A | 8/2000 | Flackett |
| 6,709,151 | B2 | 3/2004 | Schmidt |
| 6,755,565 | B2 | 6/2004 | Flackett |
| 2003/0067838 | A1* | 4/2003 | Schmidt .................. B01F 29/10 366/217 |
| 2006/0154765 | A1* | 7/2006 | Wang .................... A61C 9/0026 474/89 |
| 2007/0189116 | A1* | 8/2007 | Wang .................... B01F 35/421 366/279 |
| 2007/0280038 | A1* | 12/2007 | Schmidt .................. B01F 33/70 366/217 |
| 2011/0315785 | A1* | 12/2011 | Essing .................... B01F 29/10 239/142 |
| 2016/0262421 | A1 | 9/2016 | Biglari et al. |
| 2017/0312945 | A1 | 11/2017 | Mizoguchi et al. |
| 2021/0086148 | A1* | 3/2021 | Gross .................... F16H 7/1263 |
| 2022/0161208 | A1* | 5/2022 | Ito ...................... B01D 19/0052 |

\* cited by examiner

ROTATION MIXER WITH CONTINUOUS BELT DRIVE

CROSS-REFERENCE TO RELATED APPLICATION

This application claims benefit of U.S. provisional patent application No. 62/902,860, filed Sep. 19, 2019, entitled ROTATION MIXER WITH IMPROVED BELT DRIVE, and commonly assigned to the assignee of the present application, the disclosure of which is incorporated by reference in its entirety herein.

FIELD

The present disclosure relates generally to devices and methods of mixing. More specifically, the present disclosure relates to devices and methods for mixing fluids, semi-fluids, gels, particles, powders, and other flowable material.

BACKGROUND

Dynamic mixing, such as rotation mixing, can provide effective, non-invasive mixing of substances or formulations, and without mixer components extending into the substance, such as stirring rods. Rotational mixers can include a rotation and/or or oscillation component to assist in mixing the substances. Dual Asymmetric Centrifugal (DAC) mixing can be particularly fast and effective by imposing centrifugal (centripetal) force in multiple directions on the substance(s) to be mixed. Various containers can be selected for containing the substance(s) to be mixed and undergoing the DAC rotation.

SUMMARY

According to an aspect of the present disclosure, a rotation mixer may include a housing, a drive unit coupled to the housing, a carriage mounted on the drive unit for rotation relative to the housing, and a basket mounted for rotation relative to the carriage. The basket may receive material to be mixed. The carriage may include an arm and a drive line coupled to the arm. The arm may be mounted on the drive unit for rotation about a first axis relative to the housing, and the drive line may convert rotation of the arm into rotation of the basket about a second axis relative to the arm during use of the rotation mixer. The second axis may be arranged at an oblique angle relative to the first axis.

In illustrative embodiments, the drive line may include a belt and a plurality of pulleys coupled to the arm. The belt may be routed around the pulleys and engage with a ring gear coupled to the basket and a transfer gear coupled to the housing. The transfer gear may be fixed against rotation about the first axis.

In illustrative embodiments, the arm may include opposite first and second ends and a support body extending between the first and second ends. The basket may be mounted to the first end and the support body may be mounted to the drive unit. A counterweight may be coupled to the second end. A bore may extend into the support body to receive a shaft of the drive unit.

In illustrative embodiments, the plurality of pulleys may include six pulleys. Four pulleys may be coupled adjacent to the bore, and two of the pulleys may be coupled adjacent to the second end.

In illustrative embodiments, a tensioner may be coupled to the arm and arranged to adjust a tension in the belt. The tensioner may include a frame coupled to the arm and an adjustment mechanism coupled between the arm and the frame for selective movement of the frame relative to the arm. Two pulleys of the plurality of pulleys may be coupled to the frame for movement with the frame relative to the arm.

BRIEF DESCRIPTION OF THE DRAWINGS

The drawings disclose exemplary embodiments in which like reference characters designate the same or similar parts throughout the figures of which.

DETAILED DESCRIPTION

Figure 1:
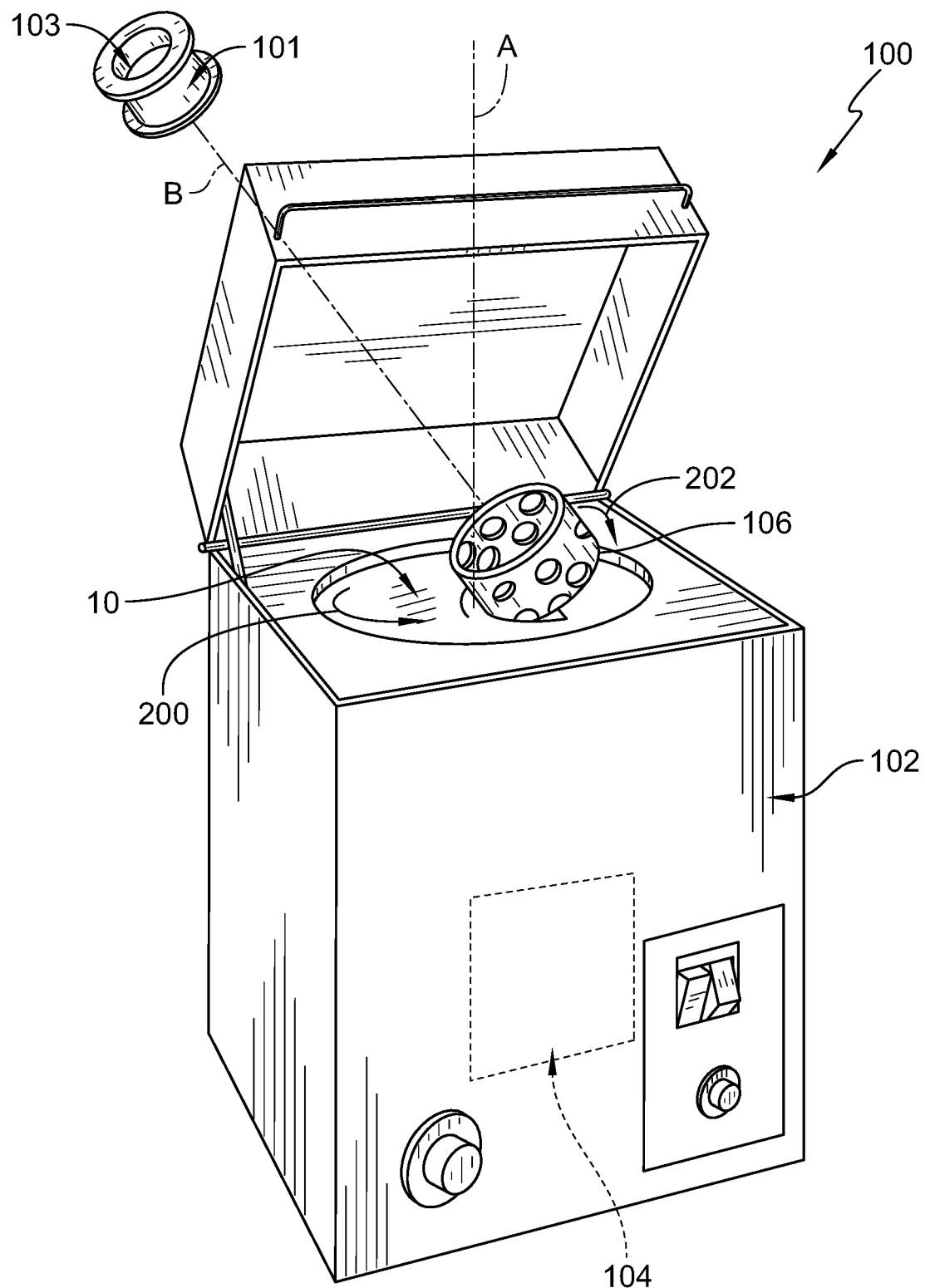
FIG. 1 is a perspective view of a rotation mixer in accordance with the present disclosure.

Unless otherwise indicated, the drawings are intended to be read (for example, cross-hatching, arrangement of parts, proportion, degree, or the like) together with the specification, and are to be considered a portion of the entire written description of this invention. As used in the following description, the terms "horizontal", "vertical", "left", "right", "up" and "down", "upper" and "lower" as well as adjectival and adverbial derivatives thereof (for example, "horizontally", "upwardly", or the like), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate For the purposes of promoting an understanding of the principles of the disclosure, reference will now be made to a number of illustrative embodiments illustrated in the drawings and specific language will be used to describe the same.

Figure 2:
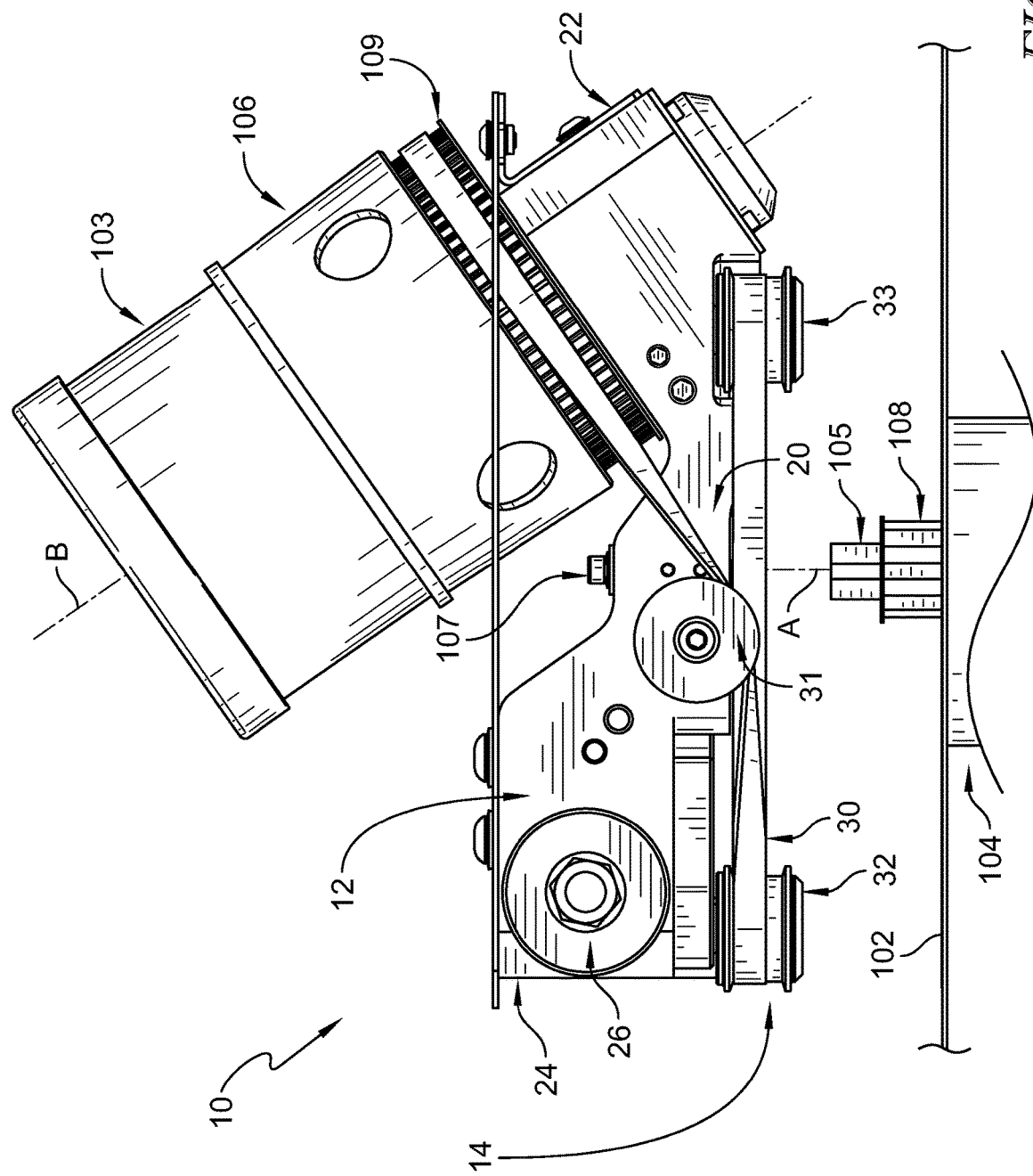
FIG. 2 is an exploded assembly view showing a carriage of the rotation mixer separated from a drive unit.
Figure 3:
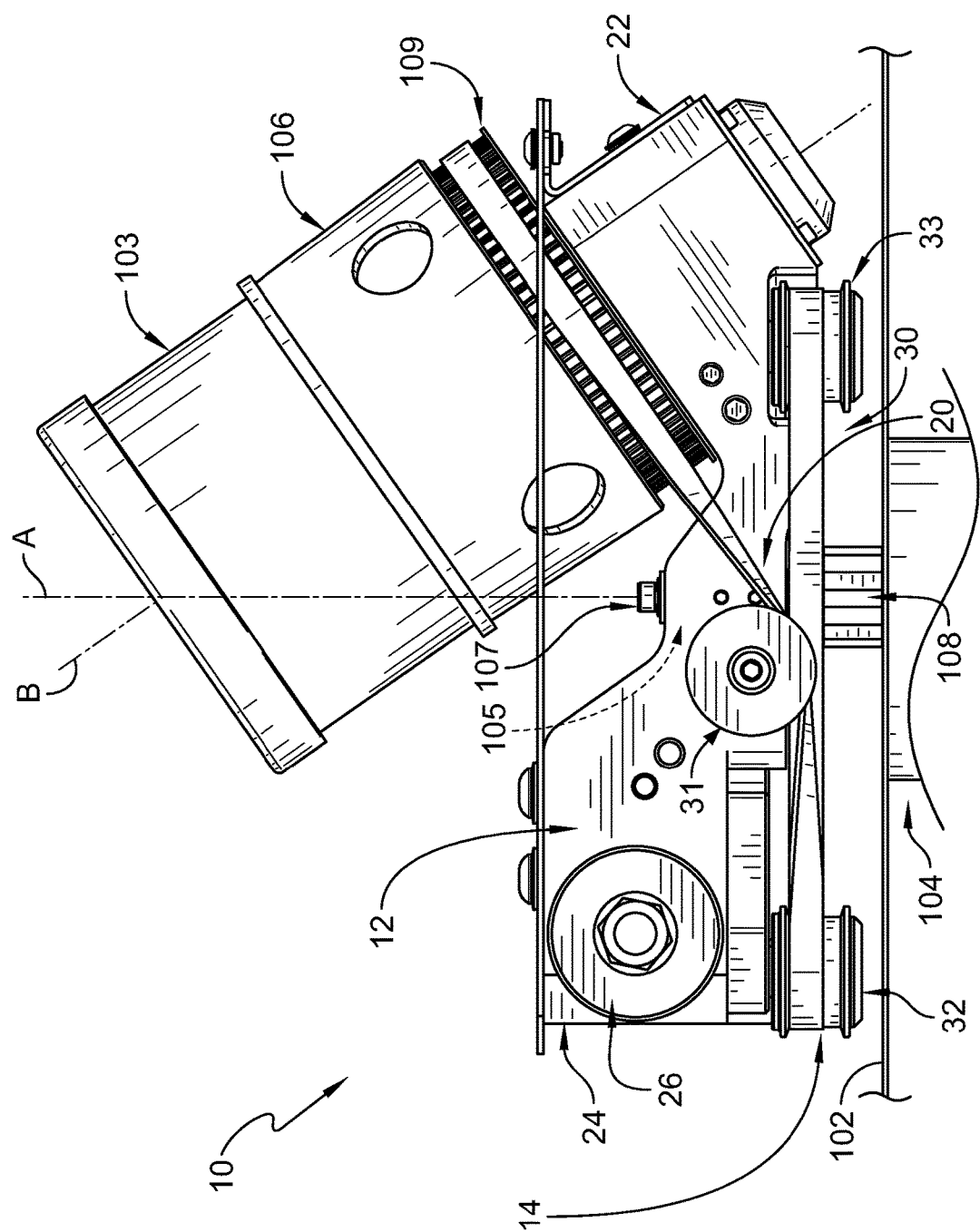
FIG. 3 is a side elevation view of showing the carriage mounted on the drive unit.
Figure 6:
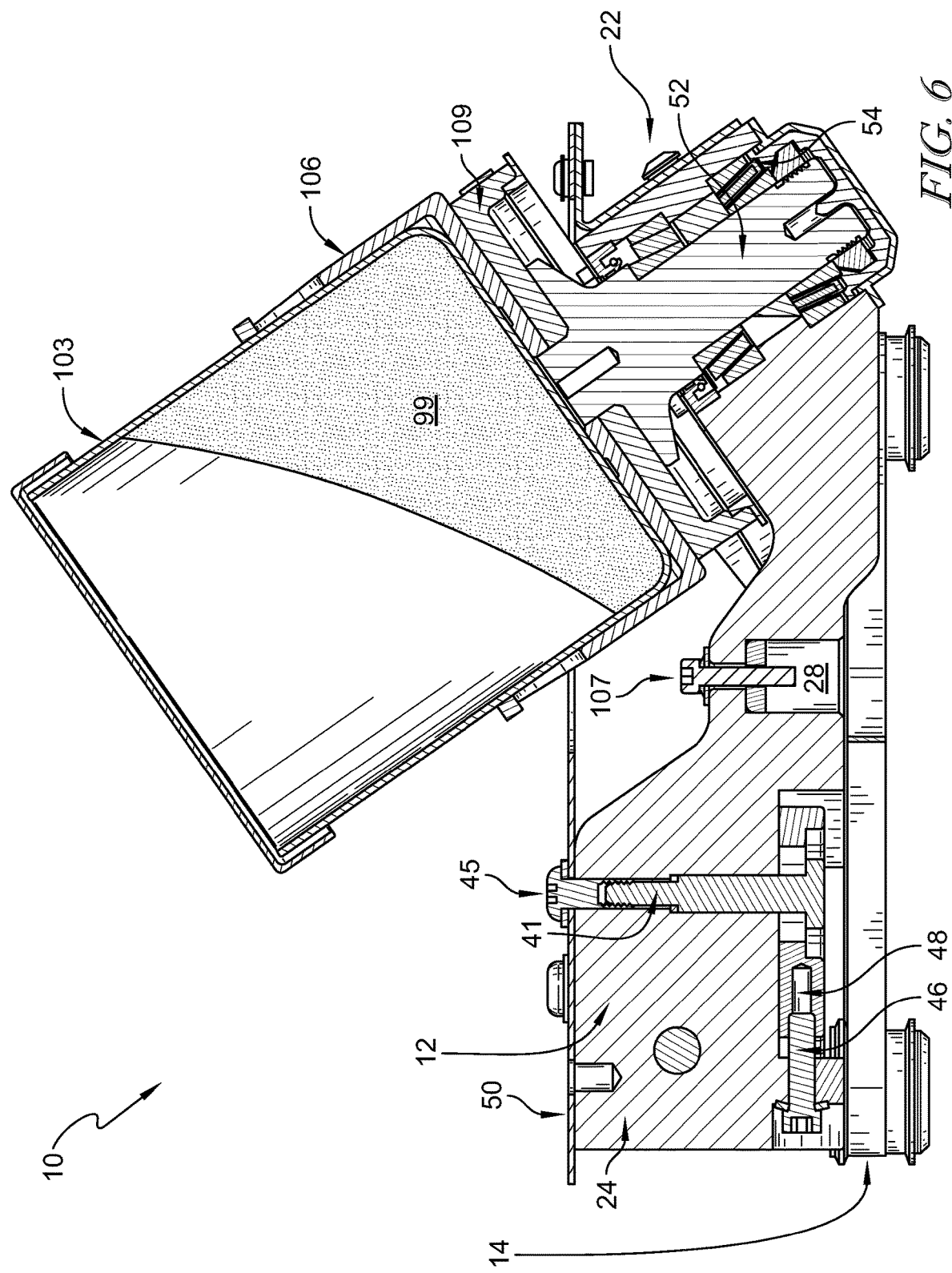
FIG. 6 is a sectional view taken along line 6-6 in FIG. 5.

In the illustrative embodiment, a rotation mixer 100 includes a housing 102, a drive unit 104 coupled to housing 102, a carriage 10 (sometimes referred to as an arm) mounted on drive unit 104 for rotation relative to housing 102, and a basket 106 mounted for rotation relative to carriage 10 as shown in FIGS. 1-3. In some embodiments, basket 106 is shaped and designed to receive a holder 101 with a material container 103 as shown in FIG. 1. In some embodiments, basket 106 receives material container 103 directly as shown in FIGS. 2 and 3. A material to be mixed 99 is received in material container 103 as shown in FIG. 6. In some embodiments, rotation mixer 100 is arranged as a Dual Asymmetric Centrifugal (DAC) rotation mixer.

Carriage 10 in accordance with the present disclosure includes an arm 12 and a drive line 14 coupled to arm 12 as shown in FIGS. 2 and 3. Carriage 10 is mounted on drive unit 104, such as an electric motor, for rotation about a first axis A in a rotational direction (indicated by arrow 200)

relative to housing 102 during use of rotation mixer 100. Basket 106 is arranged for rotation about a second axis B in a rotational direction (indicated by arrow 202) during use of rotation mixer 100. Axis B is arranged at an oblique angle relative to axis A. A transfer gear 108 is coupled to housing 102 and fixed against rotation about axis A. Drive line 14 engages with transfer gear 108 and a ring gear 109 coupled to basket 106 to convert rotation of arm 12 about axis A into rotation of basket 106 about axis B. In the illustrative embodiment, carriage 10 and basket 106 rotate in opposite rotational directions 200 and 202 around their respective axes A, B. For example, in the perspective of FIG. 1, carriage 10 rotates counter-clockwise around axis A while basket 106 rotates clockwise around axis B.

Examples of some rotational mixers can be found within U.S. Pat. Nos. 6,099,160 and 6,755,565, the disclosures of each of which are incorporated by reference herein in their entireties. Such dual axis rotation mixing including asymmetric rotation may be referred to as planetary mixing and/or centrifugal mixing, although these terms may not be entirely accurate and are not intended to limit mixing parameters such as the direction of rotation about each of the dual axes, speed, and/or other geometry relationships.

Figure 4:
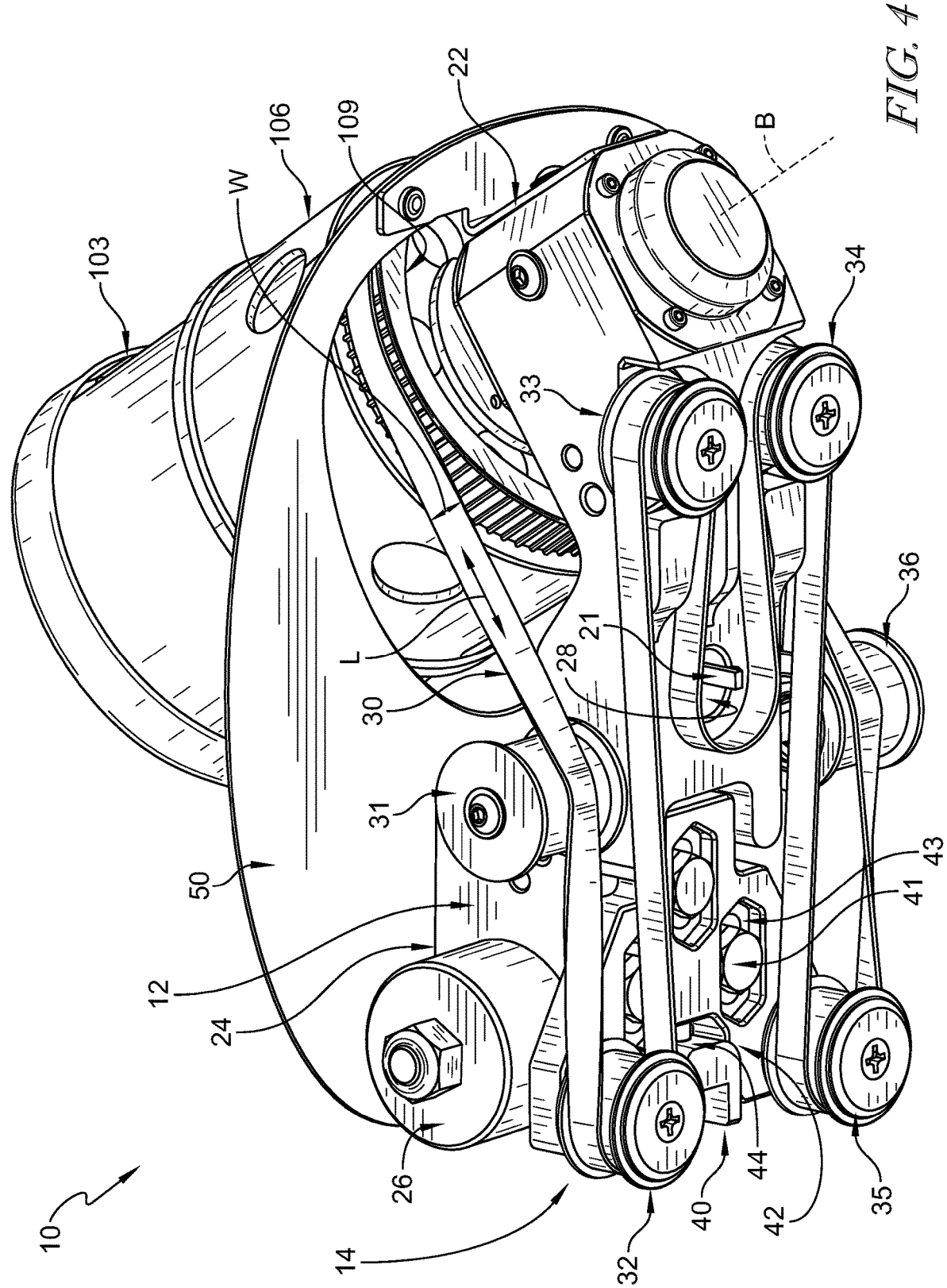
FIG. 4 is a lower perspective view of the carriage of FIG. 2.
Figure 7:
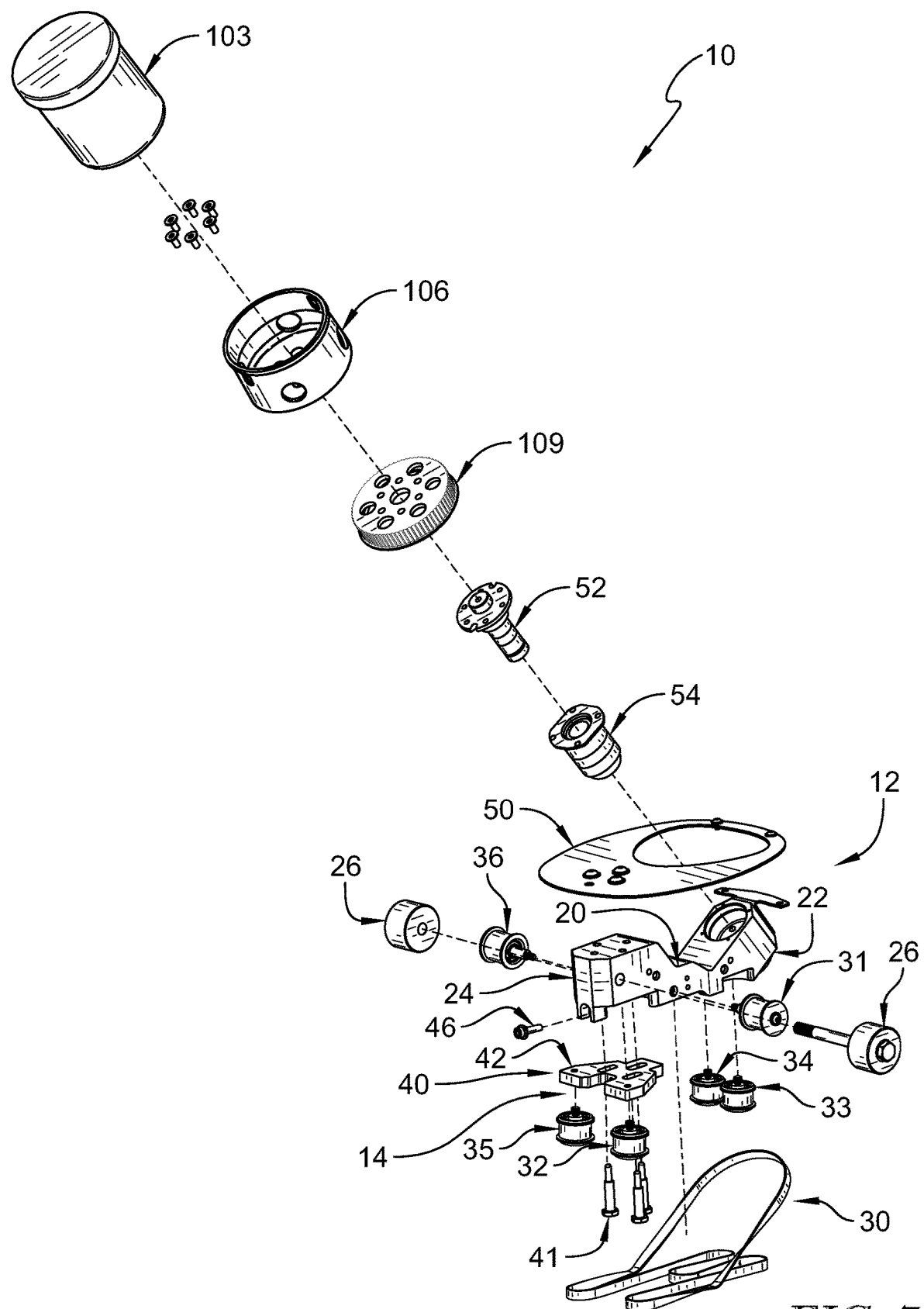
FIG. 7 is an exploded assembly view of the carriage of FIG. 2.

Arm 12 includes a first end 22, a second end 24 spaced apart from first end 22, and a support body 20 extending between first and second ends 22, 24 as shown in FIGS. 2-4. Basket 106 is coupled to first end 22 and arranged for rotation relative to arm 12. For example, basket 106 can be coupled to a spindle 52 engaged with one or more bearings 54 mounted in first end 22 to support basket 106 on arm 12 while allowing rotation about axis B as shown in FIGS. 6 and 7. In some embodiments, one or more counterweights 26 are coupled to second end 24 of arm 12 to balance carriage 10. For example, counterweights 26 can be arranged to align a center of gravity of carriage 10 along axis A.

Figure 5:
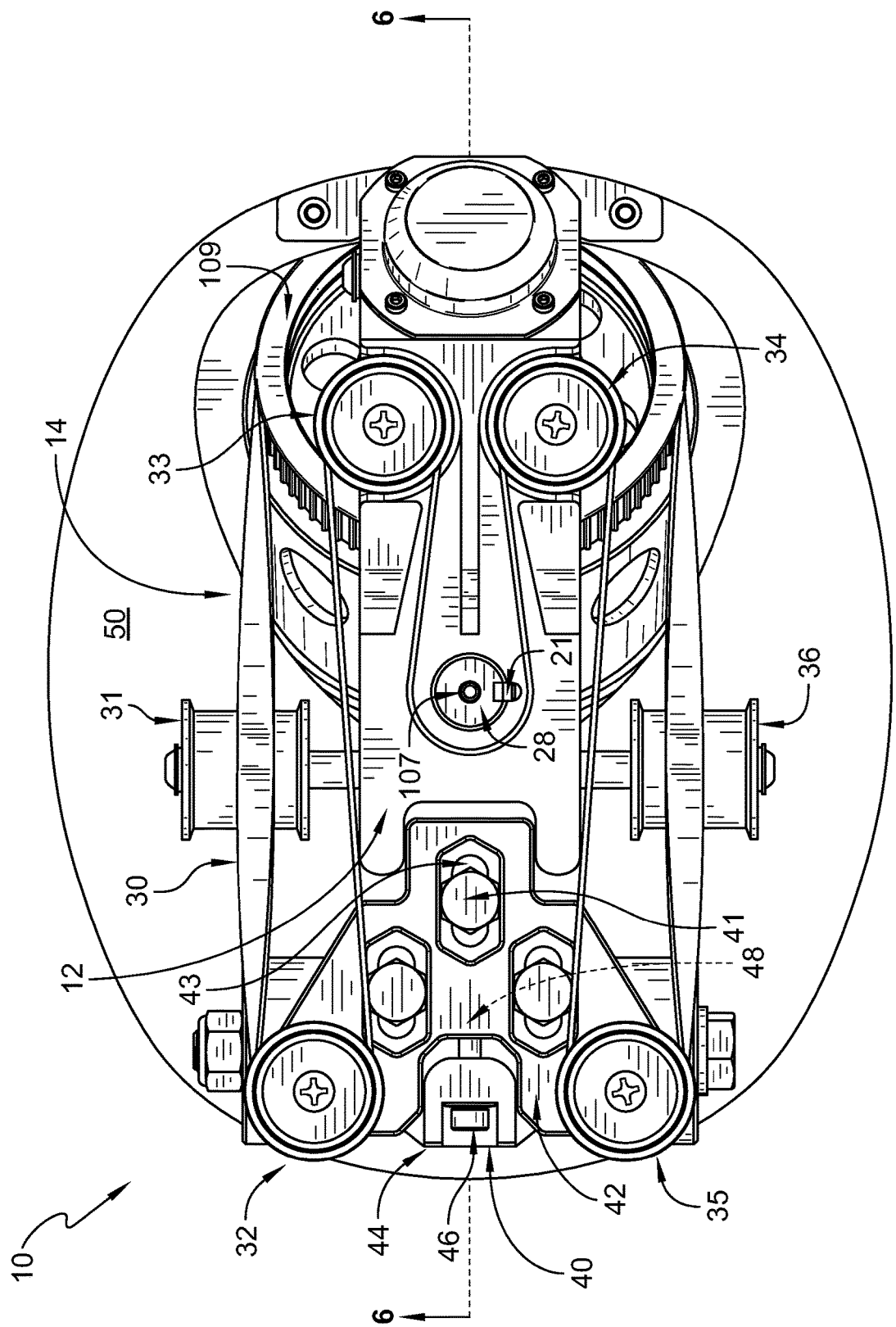
FIG. 5 is a bottom plan view of the carriage of FIG. 4.

A shaft 105 of drive unit 104 engages with support body 20 of arm 12 and a fastener 107, such as a bolt, engages with arm 12 and shaft 105 to hold arm 12 on drive unit 104 as suggested in FIGS. 2 and 3. Arm 12 is shown separated from shaft 105 in FIG. 2 and mounted on shaft 105 in FIG. 3. In the illustrative embodiment, a bore 28 is formed into support body 20 and sized to receive at least a portion of shaft 105 therein as shown in FIGS. 4-6. In some embodiments, a press fit is formed between shaft 105 and bore 28. In some embodiments, a key 21 engages with arm 12 and shaft 105 to block rotation of shaft 105 relative to arm 12. In some embodiments, at least a portion of fastener 107 is narrower than bore 28 (as seen in FIGS. 5 and 6) and extends through bore 28 to engage with shaft 105. In some embodiments, bore 28 is threaded to receive a removal tool having a threaded end to engage with the threads of bore 28 and force arm 12 off of shaft 105.

Drive line 14 includes a belt 30 and a plurality of pulleys 31, 32, 33, 34, 35, 36 coupled to arm 12 as shown in FIGS. 2-5. Belt 30 is formed as a continuous loop along a length direction L (FIG. 4) and routed around pulleys 31-36, transfer gear 108, and ring gear 109. In some embodiments, belt 30 is formed to define ribs or teeth for engaging with corresponding ribs or teeth on gears 108, 109. Pulleys 31-36 guide belt 30 between transfer gear 108 and ring gear 109. In the illustrative embodiment, the plurality of pulleys 31, 32, 33, 34, 35, 36 includes a pair of first pulleys 31, 36 coupled to support body 20, a pair of second pulleys 32, 35 coupled to second end 24, and a pair of third pulleys 33, 34 coupled to first end 22 as shown in FIG. 4. Belt 30 extends from ring gear 109 (coupled to basket 106) to first pulleys 31, 36, extends from first pulleys 31, 36 to second pulleys 32, 35, extends from second pulleys 32, 35 to third pulleys 33, 34, and extends from third pulleys 33, 34 to transfer gear 108 (coupled with housing 102). First pulleys 31, 36 are arranged substantially perpendicular to axis A, and second pulleys 32, 35 and third pulleys 33, 34 are arranged substantially parallel to axis A.

Belt 30 flexes and twists between various orientations during movement along pulleys 31-36 and gears 108, 109. For example, from the perspective of FIGS. 2 and 3, belt 30 twists across a width direction W (FIG. 4) of belt 30 from a substantially vertical orientation at ring gear 109 (e.g., width direction W arranged substantially parallel to axis B) to a substantially horizontal orientation at pulley 31 (e.g., width direction W arranged substantially perpendicular to axis A and/or axis B) and back to a substantially vertical orientation at pulley 32 (e.g., width direction W arranged substantially parallel to axis A). Pulley 31 is spaced apart from ring gear 109, and pulley 32 is spaced apart from pulley 31, to allow belt 30 to twist along a substantial distance, such as from adjacent first end 22 of arm 12 to adjacent bore 28 and from adjacent bore 28 to adjacent second end 24. These distances are longer than in other devices, such as the one found within U.S. Pat. No. 6,709,151, the disclosure of which is incorporated by reference herein in its entirety.

The arrangement of pulleys 31, 32, 35, 36 relative to ring gear 109 also limit an amount of twist on belt 30. For example, belt 30 twists about 90 degrees or less from the orientation on ring gear 109 to the orientation on pulley 31. Belt 30 then twists back 90 degrees from the orientation on pulley 31 to the orientation on pulley 32, resulting in a total twist on belt 30 of about 90 degrees from ring gear 109 to pulley 32 as compared to about 180 degrees of total twist on belts used in other devices. Twisting of belt 30 by more than 90 degrees but less than 180 degrees is also contemplated by the present disclosure.

The arrangement of drive line 14, including the spacing and orientation of pulleys 31-36, limits wear on belt 30. The use of six pulleys 31-36 in drive line 14, as compared to four pulleys used in other devices, further limits wear on belt 30 and limits stresses experienced at each pulley 31-36. An overall length of belt 30 is also longer than belts in other devices, further reducing wear on belt 30, as contact points with the pulleys or turns and twists on any point along belt 30 occur less often as the belt 30 travels through the pulley system. Arrangement of pulleys 31-36 and subsequently routing of belt 30 on pulleys 31-36 also allows first end 22 of arm 12 and basket 106 to be arranged closer to drive unit 104 relative to second end 24, thereby moving a center of gravity of carriage 10 closer to drive unit 104 compared to other devices. First end 22 of the arm 12 can further be lowered closer to drive unit 104 in the housing 102, thereby permitting basket 106 to sit lower in the housing 102, reducing gravitational forces acting on the basket 106 during the mixing process. These advantages that can provide for a reduction of materials, cost and complexity of the carriage 10 and/or an increase in durability of the carriage 10.

In the illustrative embodiment, a tensioner 40 is coupled to arm 12 and configured for adjusting a tension along belt 30 as shown in FIGS. 2-5. Tensioner 40 allows adjustment of tension in belt 30 to levels sufficient for efficient operation of drive line 14 while minimizing stress on pulleys 31-36. Tensioner 40 includes a frame 42 coupled to second end 24 of arm 12 and an adjustment mechanism 44 coupled between arm 12 and frame 42 for selective movement of frame 42 relative to arm 12. Pulleys 32, 35 are mounted to frame 42 for movement with frame 42 relative to arm 12. In some embodiments, adjustment mechanism 44 includes a threaded fastener 46, such as a bolt, engaged with arm 12 and extending into a threaded hole 48 of frame 42 to drive movement of frame 42 with rotation of fastener 46. In some embodiments, fasteners 41 extend through slots 43 of frame 42 to hold frame 42 on arm 12 and allow sliding movement of frame 42 relative to arm 12 as shown in FIGS. 4-7. In some embodiments, fasteners engage with caps 45 to couple fasteners 41 with arm 12. A cover plate 50 is coupled to arm 12 to block access to drive line 14 during operation of rotational mixer 100. In some embodiments, a weight of frame 42 allows smaller counterweights 26 to be used compared to other devices. Tensioner 40 can illustratively act as a counter mass to the basket 106 on arm 12 during rotation of arm 12 about axis A.

Figure 8:
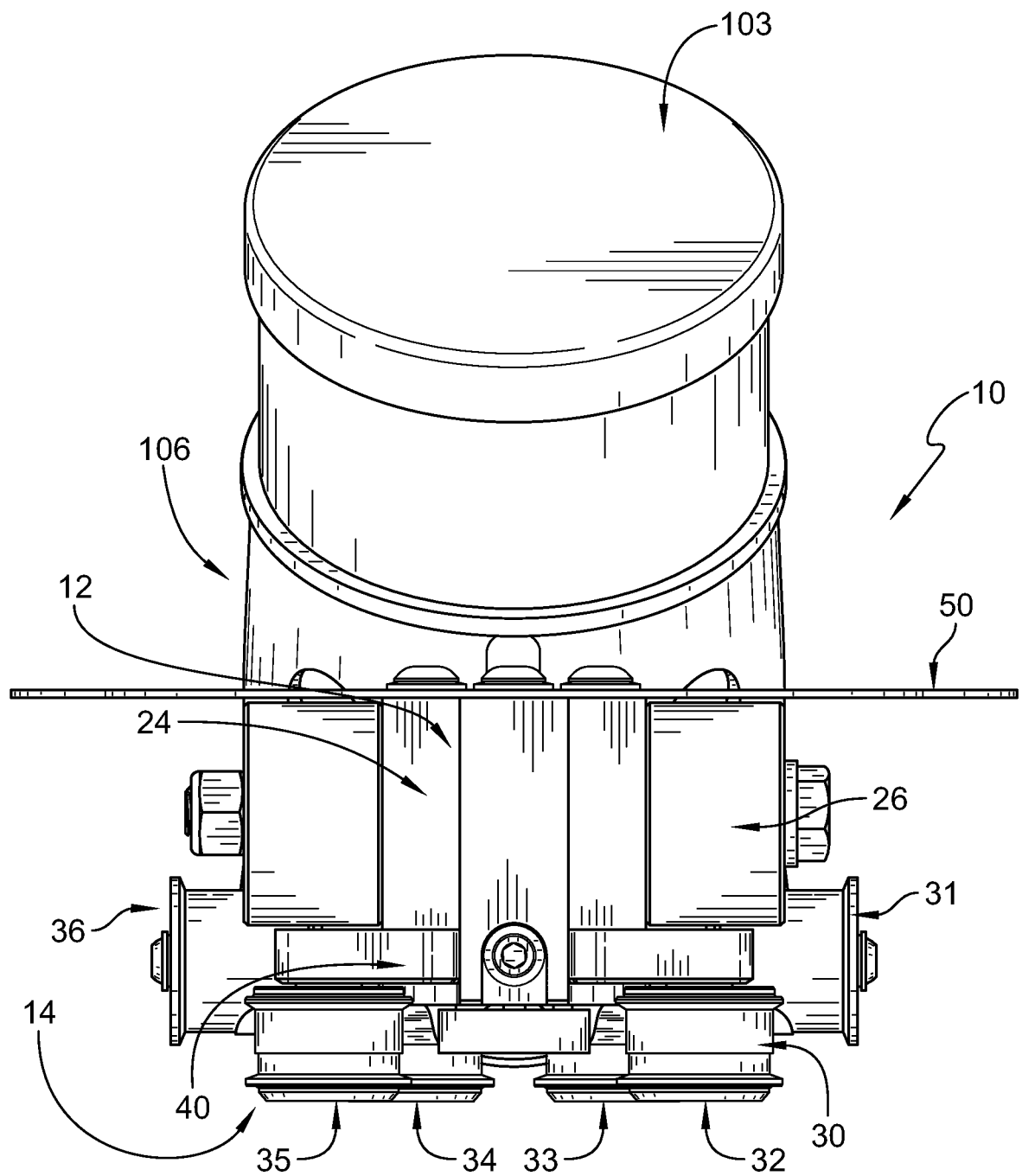
FIG. 8 is a rear elevation view of the carriage of FIG. 2.
Figure 9:
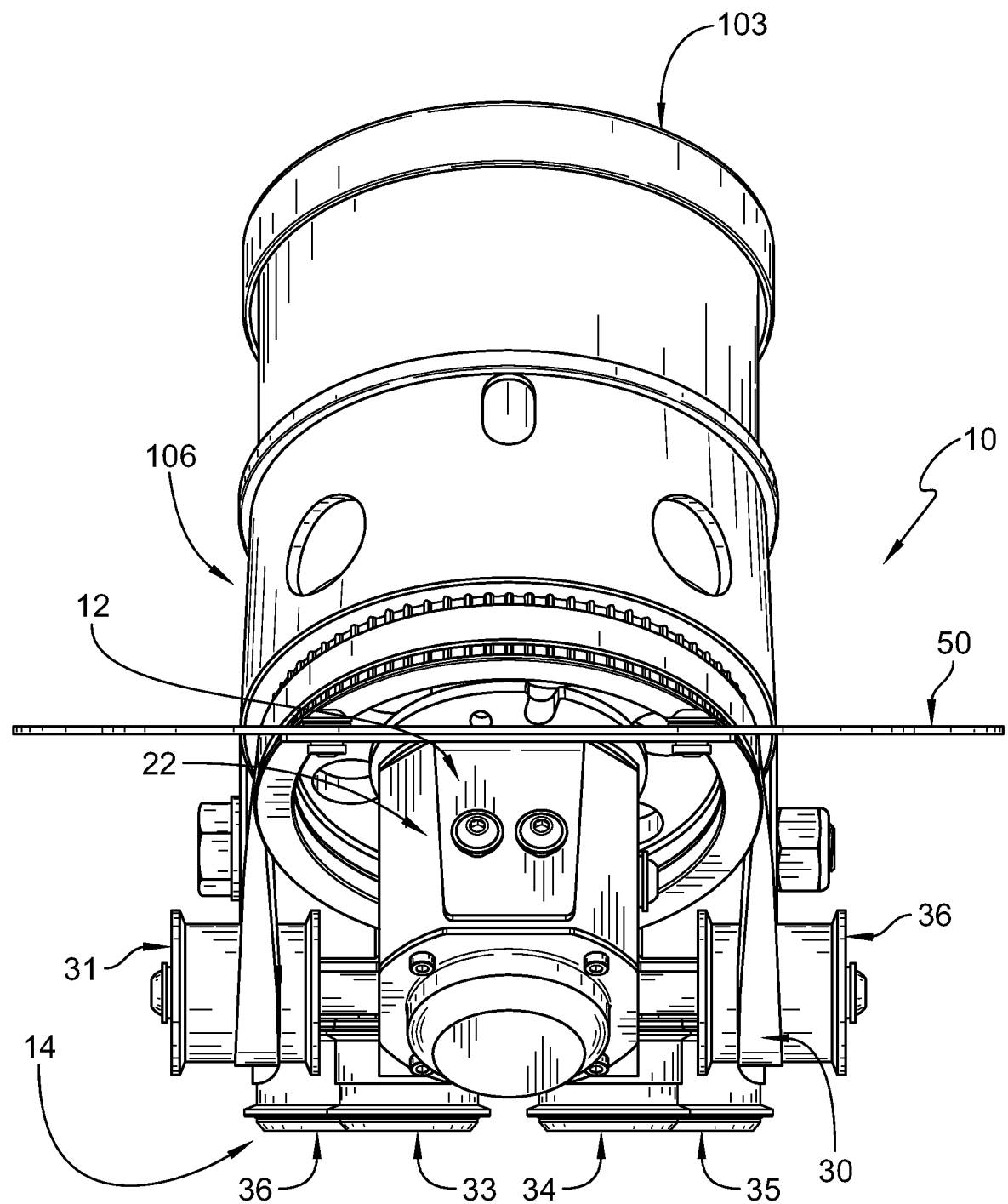
FIG. 9 is a front elevation view of the carriage of FIG. 2.
Figure 10:
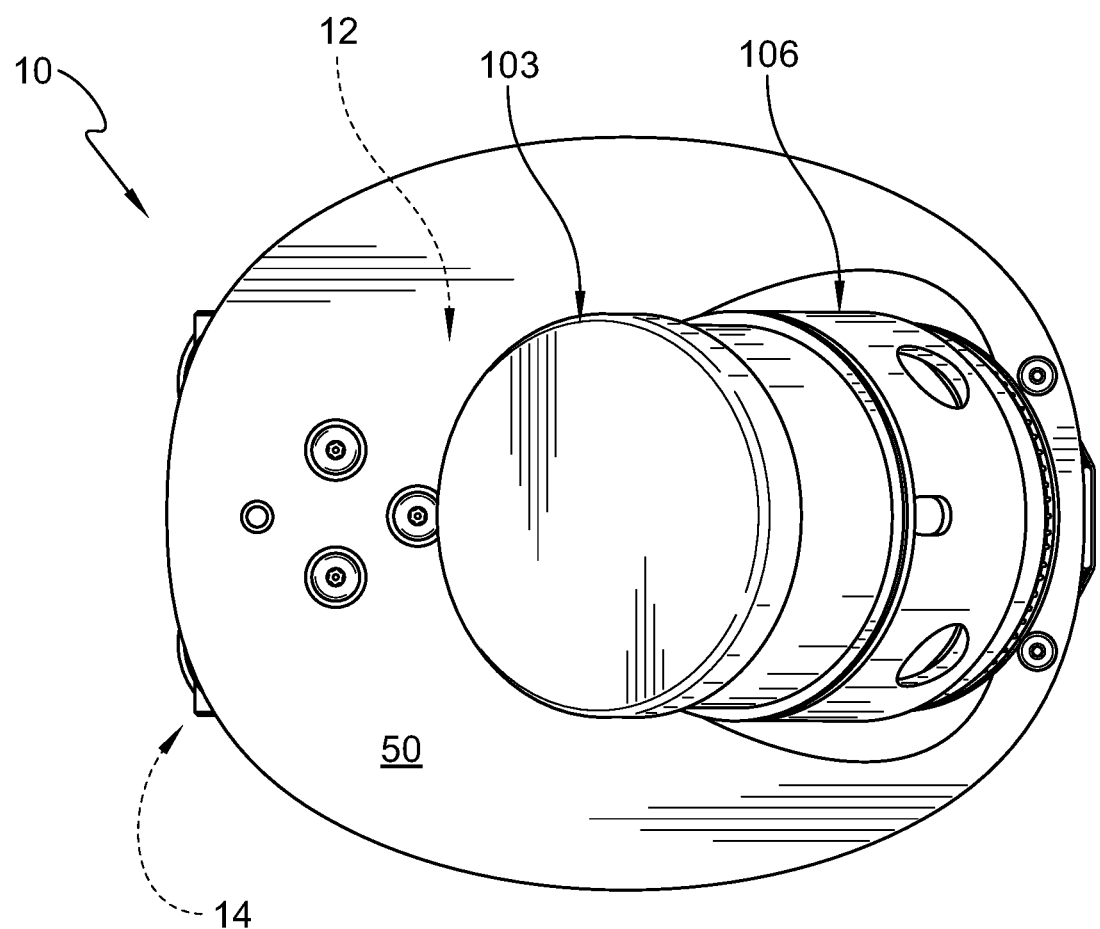
FIG. 10 is a top plan view of the carriage of FIG. 2.

Additional views of carriage 10 can be seen in FIGS. 8-10.

Substances or formulations that can be mixed in rotation mixer 100 include, but are not limited to, fluids, semi-fluids, suspensions, colloids, gels, pastes, articles, granules, powders, other flowable material, and mixtures or combinations of at least two of the foregoing. Examples of materials that can be mixed include, but are not limited to, creams, epoxies, inks, adhesives, sealants, and coatings.

The variations and benefits of each embodiment described herein are equally applicable to the other embodiments described herein, and any combinations therebetween are fully contemplated by this disclosure.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

The invention claimed is:

1. A rotation mixer, comprising:
 a housing;
 a drive unit coupled to the housing; and
 a carriage mounted on the drive unit for rotation relative to the housing about a first axis, the carriage comprising:
  an arm including a first end, a second end spaced apart from first end, and a support body extending between the first and second ends, the support body being coupled to the drive unit;
  a drive line including a plurality of pulleys coupled to the arm and a belt routed around the pulleys;
  a basket mounted on the first end of the arm for rotation relative to the arm about a second axis arranged at an oblique angle relative to the first axis;
 wherein the belt is formed as a continuous loop along a length direction of the belt, the belt is coupled to the housing and to the basket such that rotation of the arm about the first axis drives rotation of the basket about the second axis, and the plurality of pulleys are arranged such that the belt twists across a width direction of the belt less than about 90 degrees throughout the drive line;
 wherein the plurality of pulleys includes at least a pair of first pulleys coupled to the support body of the arm, and a pair of second pulleys coupled to a frame; and
 a tensioner including the frame coupled to the second end of the arm and an adjustment mechanism coupled between the arm and the frame for selective movement of the frame relative to the arm.

2. The rotation mixer of claim 1, further comprising a pair of third pulleys coupled to the first end of the arm.

3. The rotation mixer of claim 2, wherein the belt extends from the basket to the first pulleys, extends from the first pulleys to the second pulleys, extends from the second pulleys to the third pulleys, and extends from the third pulleys toward the second end of the arm to couple with the housing.

4. The rotation mixer of claim 3, wherein the first pulleys are arranged substantially perpendicular to the first axis, and wherein the second pulleys and the third pulleys are arranged substantially parallel to the first axis.

5. The rotation mixer of claim 1, further comprising a fastener extending through a slot of the frame and engaging with the arm to hold the frame on the arm and allow sliding movement of the frame relative to the arm.

6. The rotation mixer of claim 1, wherein the adjustment mechanism includes a threaded fastener extending through a portion of the arm and engaged with the frame such that rotation of the threaded fastener drives movement of the frame relative to the arm.

7. The rotation mixer of claim 1, wherein the width direction of the belt is substantially parallel to the second axis adjacent to the basket, substantially perpendicular to at least one of the first and second axes adjacent to the support body of the arm, and substantially parallel to the first axis adjacent to the second end of the arm.

8. The rotation mixer of claim 1, further comprising a ring gear coupled to the basket for rotation with the basket about the second axis and a transfer gear coupled to the housing, wherein the transfer gear is fixed against rotation about the first axis, and wherein the belt engages with the ring gear and the transfer gear.

9. A carriage arranged for rotation about a first axis in a rotation mixer, the carriage comprising:
 an arm including a first end, a second end spaced apart from first end, and a support body extending between the first and second ends;
 a drive line including a plurality of pulleys coupled to the arm and a belt routed around the pulleys, wherein the plurality of pulleys includes a pair of first pulleys coupled to the support body of the arm, a pair of second pulleys coupled to the second end of the arm, and a pair of third pulleys coupled to the first end of the arm; and
 a basket mounted on the first end of the arm for rotation relative to the arm about a second axis arranged at an oblique angle relative to the first axis,
 wherein the belt is formed as a continuous loop along a length direction of the belt, the belt is coupled to the basket such that rotation of the arm about the first axis drives rotation of the basket about the second axis, and the plurality of pulleys are arranged such that the belt twists across a width direction of the belt less than about 90 degrees throughout the drive line.

10. The carriage of claim 9, wherein the belt extends from the basket to the first pulleys, extends from the first pulleys to the second pulleys, extends from the second pulleys to the third pulleys, and extends from the third pulleys toward the second end of the arm.

11. The carriage of claim 10, wherein the first pulleys are arranged substantially perpendicular to the first axis, and wherein the second pulleys and the third pulleys are arranged substantially parallel to the first axis.

12. The carriage of claim 10, further comprising a tensioner including a frame coupled to the second end of the arm and an adjustment mechanism coupled between the arm and the frame for selective movement of the frame relative to the arm, wherein the second pulleys are coupled to the frame for movement with the frame relative to the arm.

13. The carriage of claim 12, further comprising a fastener extending through a slot of the frame and engaging with the arm to hold the frame on the arm and allow sliding movement of the frame relative to the arm.

14. The carriage of claim 12, wherein the adjustment mechanism includes a threaded fastener extending through a portion of the arm and engaged with the frame such that rotation of the threaded fastener drives movement of the frame relative to the arm.

15. The carriage of claim 9, wherein the width direction of the belt is substantially parallel to the second axis adjacent to the basket, substantially perpendicular to at least one of the first and second axes adjacent to the support body of the arm, and substantially parallel to the first axis adjacent to the second end of the arm.

16. The carriage of claim 9, further comprising a ring gear coupled to the basket for rotation with the basket about the second axis and a transfer gear coupled to a housing, wherein the transfer gear is fixed against rotation about the first axis, and wherein the belt engages with the ring gear and the transfer gear.

17. A rotation mixer, comprising:
   a housing;
   a drive unit coupled to the housing; and
   a carriage mounted on the drive unit for rotation relative to the housing about a first axis, the carriage comprising:
      an arm including a first end, a second end spaced apart from first end, and a support body extending between the first and second ends, the support body being coupled to the drive unit;
      a drive line including a plurality of pulleys coupled to the arm and a belt routed around the pulleys, the plurality of pulleys including a pair of first pulleys coupled to the support body of the arm, a pair of second pulleys coupled to the second end of the arm, and a pair of third pulleys coupled to the first end of the arm; and
      a basket mounted on the first end of the arm for rotation relative to the arm about a second axis arranged at an oblique angle relative to the first axis,
   wherein the belt is formed as a continuous loop along a length direction of the belt and extends from the basket to the first pulleys, extends from the first pulleys to the second pulleys, extends from the second pulleys to the third pulleys, and extends from the third pulleys toward the second end of the arm, the belt is coupled to the housing and to the basket such that rotation of the arm about the first axis drives rotation of the basket about the second axis, the first pulleys are arranged substantially perpendicular to the first axis, the second pulleys and the third pulleys are arranged substantially parallel to the first axis, and a width direction of the belt is substantially parallel to the second axis adjacent to the basket, substantially perpendicular to at least one of the first and second axes adjacent to the support body of the arm, and substantially parallel to the first axis adjacent to the second end of the arm.

18. The rotation mixer of claim 17, further comprising a tensioner including a frame coupled to the second end of the arm and an adjustment mechanism coupled between the arm and the frame for selective movement of the frame relative to the arm, wherein the second pulleys are coupled to the frame for movement with the frame relative to the arm.

\* \* \* \* \*